No. 793,184.  Patented June 27, 1905.

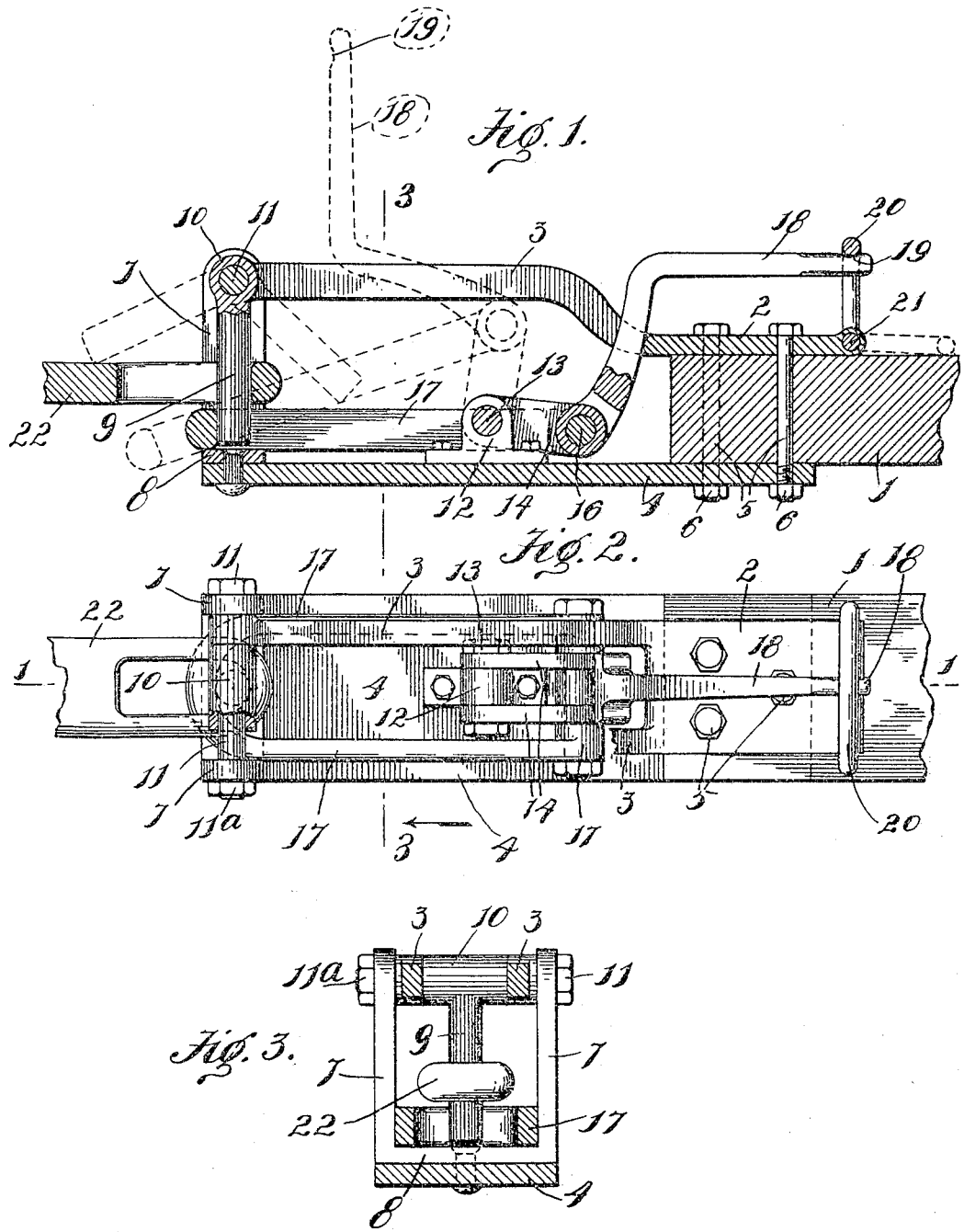

UNITED STATES PATENT OFFICE.

DAVID FINLAY, OF KILLARNEY, CANADA.

COUPLING DEVICE.

SPECIFICATION forming part of Letters Patent No. 793,184, dated June 27, 1905.

Application filed August 4, 1904. Serial No. 219,433.

*To all whom it may concern:*

Be it known that I, DAVID FINLAY, of Killarney, Province of Manitoba, Canada, have invented certain new and useful Improvements in Coupling Devices; and I do hereby declare that the following is a full, clear, and exact description of the invention, such as will enable others skilled in the art to which it appertains to make and use the same.

My invention relates to couplings, and especially to that class of couplings or coupling devices which are applicable to traction-engines.

The object of my invention is to provide a coupling which will be maintained in locked position by the application of draft thereto when its parts are in normal position and which may be unlocked by the like application of draft when the parts are in abnormal position.

A further object of my invention is to provide a simple form of coupling which can be easily applied and one which will be efficient; and my invention consists of the construction, combination, and arrangement of parts, as herein illustrated and described.

In the accompanying drawings, forming a part of this application, in which similar reference-numerals indicate corresponding parts, I have illustrated one form of embodiment of my invention, and in which—

Figure 1 is a central vertical section taken along line 1 1 of Fig. 2, showing the movable parts of the device in two positions. Fig. 2 is a top plan view partly broken away to show some of the parts, and Fig. 3 is a vertical section taken on line 3 3 of Figs. 1 and 2.

Referring to the drawings, 1 designates the tongue or draw-bar of a vehicle, on top of which tongue is disposed an upper plate 2, having an upward and outward extending bifurcated portion divided into two tines or arms 3. Disposed beneath the tongue 1 is a lower plate 4 of slightly greater width than the plate 2. The two plates are connected with each other and to the tongue by bolts 5, held in position by the nuts 6, or the plates may be otherwise secured in any suitable manner.

Upon the outer end of the plate 4 is secured a yoke 8, which has upwardly-extending members 7, arranged with their upper ends near the outer extremities of the said arms 3 of the upper plate.

Disposed between the arms 3 is a pin 9, pivotally supported by its sleeve 10, through which is passed a bolt 11 or other suitable securing means, which may be inserted through openings in the outer ends of said arms 3 and the upper ends of said members 7, a nut 11ª being provided to hold the parts together on the bolt.

Secured to the upper face of the lower plate 4 is a bearing 12, in which is journaled a pin 13, to which pin is pivotally connected a bifurcated lever 14, the nuts on either end of the pin 13 maintaining the lever in place. Transversely through the lever 14 there is an opening in which is disposed a pin 16, the ends of which are journaled in an open-ended link 17, which link extends forward to a point just beyond the position normally occupied by the pivotally-supported pin 9. From the point at which this pin is connected to the lever the lever is extended upward and backward, terminating in a handle 18, having a recess 19 therein, which is adapted to be engaged by a member 20, pivotally secured to the upper plate 2, as at 21, for the purpose of locking the lever when a vehicle to which it is attached is passing over uneven surfaces.

22 is a coupling-link adapted to be held by the coupling just described.

As shown in full lines in Fig. 1, the pin 16 is normally below the plane of the pin 13, so that any draft exerted on the link 22 and communicated thereby to the link 17 maintains the lever in depressed position. When the lever is raised so that the pin 16 is carried above the plane of the pin 13, the application of draft will actuate the lever to the position shown in dotted lines in Fig. 1.

In the operation of my invention from an inspection of the drawings it is obvious that the pin 9 will readily swing backward, as shown in dotted lines to the right of the pin in Fig. 1, when a link, such as 22, is inserted between the members 7 of the yoke; that as soon as the link 22 has passed such dotted-line position of the pin the pin will fall of its own weight to the full-line position of the same figure, and that as soon as draft is applied against the pin it will be held against forward movement by the link 17. In order to uncouple the link 22, the retaining member 20 is disengaged from the handle 18. The handle is then carried upward and forward to the position shown in dotted lines in Fig. 1, and this movement of the lever lifts the rear end of the link 17 and carries its body forward to a point where the pin will be free to swing forward out of engagement with the link. It is obvious that the pin will swing forward when draft is applied, the link 17 being out of its arc of movement.

While I have shown in the accompanying drawings the preferred form of my invention, it will be understood that I do not limit myself to the precise form shown, as many of the details may be changed in form or position without affecting the operativeness or utility of my invention, and I therefore reserve the right to make all such modifications as are included within the scope of the following claims or of mechanical equivalents to the structures set forth.

Having described my invention, what I claim as new, and desire to secure by Letters Patent, is—

1. A coupling device comprising an upper and a lower plate, a member connecting the plates, a pin pivotally supported by the upper plate, and a link on the lower plate for limiting the movement of the pin and locking the parts by the application of draft.

2. A coupling device, comprising a plurality of plates, a coupling-pin supported by one of the plates, a link for maintaining the pin in operative position, and means for releasing the pin.

3. A coupling device, comprising an upper and a lower plate, a coupling-pin supported by one of the plates, a link for maintaining the pin in operative position and means for releasing the pin.

4. A coupling device, comprising an upper and a lower plate, a coupling-pin pivotally secured to the upper plate, a link for maintaining the pin in operative position, and means for releasing the pin.

5. A coupling device, comprising an upper and a lower plate, a pivotal member carried by the upper plate, a coupling-pin carried by said pivotal member, a link for maintaining the pin in operative position and means for releasing the pin.

6. A coupling device, comprising a plurality of plates, a pivotally-supported pin carried by one of the plates, a slidable link limiting the movement of the pin and means for releasing the pin from the link.

7. A coupling device, comprising a plurality of plates, a pivotally-supported pin carried by one of the plates, a slidable open-ended link limiting the movement of the pin, and means for releasing the pin from the link.

8. A coupling device, comprising a plurality of oppositely-disposed plates, a pivotally-secured pin supported by one of the plates, a slidable, pivotally-secured link limiting the movement of the pin, and means for releasing the pin from the link.

9. A coupling device, comprising a plurality of oppositely-disposed plates, a pivotally-secured pin supported by one of the plates, a slidable, pivotally-secured link limiting the movement of the pin, and a lever arranged to actuate the link.

10. A coupling device, comprising a plurality of oppositely-disposed plates, a pivotally-secured pin carried by one of the plates, a slidable, pivotally-secured link limiting the movement of the pin, and a bent lever arranged to actuate the link.

11. A coupling device, comprising an upper and a lower plate, a coupling-pin carried by one of the plates, a link limiting the movement of the pin, and a lever pivotally secured to the link and journaled on said lower plate.

12. A coupling device comprising an upper and a lower plate, a coupling-pin carried by one of the plates, a link to limit the movement of the pin, a lever pivotally secured to the link and journaled on the lower plate, and arranged to be maintained in depressed position by draft applied to the link.

13. A coupling device comprising an upper and a lower plate, a coupling-pin carried by one of the plates, a link limiting the movement of the pin, a lever pivoted to the link and journaled on the lower plate, and a yoke connecting the upper and lower plates.

14. A coupling device, comprising an upper and a lower plate, a coupling-pin carried by one of the plates, a link limiting the movement of the pin, a lever pivoted to the link and journaled on the lower plate, and a lock for said lever carried by the upper plate.

15. A coupling comprising an upper plate having a bifurcated extremity, a lower plate, a yoke connecting the upper and lower plates, a pin passing through said yoke and said extremity, a coupling-pin secured on said pin, a link arranged to limit the movement of the coupling-pin, and a lever arranged to actuate the link to release the pin.

16. A coupling device, comprising an upper member having a bifurcated extremity, a lower member, a yoke formed with arms arranged near said extremity, a bolt passing through said arms and said extremity, a member connecting the yoke and the other of said members, means adapted to hold the parts together, a coupling-pin, comprising a sleeve secured on said bolt, and a downwardly-extending body, a link arranged to limit the movement of the coupling-pin, and a lever arranged to actuate the link to release the pin.

In witness whereof I have hereunto set my hand in the presence of two witnesses.

DAVID FINLAY.

Witnesses:
A. G. HAY,
JAMES FINLAY.